United States Patent
Khami et al.

(10) Patent No.: US 9,932,941 B2
(45) Date of Patent: Apr. 3, 2018

(54) SNAP-IN SPRING CLIP ASSEMBLY

(71) Applicant: FORD GLOBAL TECHNOLOGIES, LLC, Dearborn, MI (US)

(72) Inventors: Roger Khami, Troy, MI (US); Jeff Sean Boulton, Monroe, MI (US); Jacqueline L. Tomlin, Southfield, MI (US); Ronald R. Narkun, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/618,226

(22) Filed: Feb. 10, 2015

(65) Prior Publication Data
US 2016/0230713 A1 Aug. 11, 2016

(51) Int. Cl.
| | | |
|---|---|---|
| *F02M 35/02* | (2006.01) | |
| *F16B 2/22* | (2006.01) | |
| *F16B 7/22* | (2006.01) | |
| *B01D 46/00* | (2006.01) | |
| *F16B 2/10* | (2006.01) | |

(52) U.S. Cl.
CPC ..... *F02M 35/0203* (2013.01); *B01D 46/0005* (2013.01); *F16B 2/10* (2013.01); *F16B 2/22* (2013.01); *F16B 7/22* (2013.01)

(58) Field of Classification Search
CPC ............ B01D 46/0002; B01D 46/0004; B01D 46/0005; B01D 2265/028; F02M 35/0203; F02M 35/10321
USPC ................. 55/493, 497, 495, 385.3
See application file for complete search history.

(56) References Cited

U.S. PATENT DOCUMENTS

| 2,537,662 | A | * | 1/1951 | Flora | ....................... F16B 5/065 |
|---|---|---|---|---|---|
| | | | | | 24/293 |
| 4,881,292 | A | | 11/1989 | Hoferer et al. | |
| 5,569,311 | A | * | 10/1996 | Oda | ................... B01D 46/0002 |
| | | | | | 55/493 |
| 5,725,624 | A | * | 3/1998 | Ernst | ................... B01D 46/0005 |
| | | | | | 55/497 |
| 6,231,630 | B1 | * | 5/2001 | Ernst | ................... B01D 46/0005 |
| | | | | | 55/385.3 |
| 6,306,192 | B1 | * | 10/2001 | Greif | ................... B01D 46/0004 |
| | | | | | 55/495 |
| 6,383,268 | B2 | * | 5/2002 | Oda | ................... B01D 46/0005 |
| | | | | | 55/385.3 |
| 7,854,780 | B2 | | 12/2010 | Hirsch | |

(Continued)

FOREIGN PATENT DOCUMENTS

| DE | 202005005068 U1 | 7/2005 |
|---|---|---|
| DE | 102011110124 B3 | 10/2012 |

OTHER PUBLICATIONS

English translation of DE102011110124 patent.
English translation of DE202005005068 patent.

*Primary Examiner* — Frank Lawrence, Jr.
*Assistant Examiner* — Minh-Chau Pham
(74) *Attorney, Agent, or Firm* — Greg Brown; King & Schickli, PLLC

(57) ABSTRACT

A snap-in spring clip assembly includes a discrete clip cleat and a fastener carried on the clip cleat. The discrete clip cleat includes a body having a base, a first rib depending from the base and a second rib depending from the base. The first and second ribs each include at least one resilient locking arm that allows the discrete clip cleat to be snapped into and retained in a desired position.

6 Claims, 7 Drawing Sheets

(56) References Cited

U.S. PATENT DOCUMENTS

| | | | |
|---|---|---|---|
| 8,236,080 B2* | 8/2012 | Desjardins | B01D 46/0004 |
| | | | 24/505 |
| 8,298,308 B2 | 10/2012 | Li | |
| 9,180,584 B1* | 11/2015 | Cook | B25B 33/00 |
| 2010/0043367 A1* | 2/2010 | Desjardins | B01D 46/0005 |
| | | | 55/493 |
| 2012/0047856 A1* | 3/2012 | Khami | B01D 46/0002 |
| | | | 55/385.3 |
| 2012/0192535 A1* | 8/2012 | Schrewe | B01D 46/0005 |
| | | | 55/385.3 |

* cited by examiner

SNAP-IN SPRING CLIP ASSEMBLY

TECHNICAL FIELD

This document relates generally to the motor vehicle equipment field and, more particularly, to a snap-in spring clip assembly incorporating a discrete clip cleat as well as to an air filter housing assembly for a motor vehicle incorporating that discrete clip cleat.

BACKGROUND

Air filter housing assemblies for today's motor vehicles typically comprise a housing and a lid manufactured using injection molded plastic. It could also be blow molded or made by other appropriate means. A serviceable air filter element is held in the housing. The compression of the filter element seal in the housing is typically accomplished by securing the lid in place with screws, hooks and fingers, spring clamps or a combination of those elements or features. In one particularly useful embodiment, a single—piece spring clip is retained to the housing with an integrally molded spring clip pin and cleat.

While such a construction is relatively inexpensive and provides for reliable operation and performance, it should be appreciated that the housing and lid must be shaped and molded in accordance with available space and the particular packaging requirements found under the hood that are potentially unique to each application. In fact, it has now been found that it may not always be desirable to integrally mold the spring clip cleat with the housing. This document relates to a new and improved spring clip assembly incorporating a discrete clip cleat and a fastener carried on that clip cleat. Further, this document relates to an air filter housing assembly incorporating a discrete clip cleat received and held in a mounting aperture in the housing of the filter assembly as well as a fastener carried on that clip cleat.

SUMMARY

In accordance with the purposes and benefits described herein, a snap-in spring clip assembly is provided. That assembly comprises a discrete clip cleat and a fastener carried on the clip cleat. The discrete clip cleat includes a body having a base, a first rib depending from the base and a second rib depending from the base. Both of the first and second ribs include at least one resilient locking arm.

In one particularly useful embodiment, the base includes a mounting flange extending beyond the first and second ribs. Further, each resilient locking arm includes a distal end having an abutment directed toward and spaced from the mounting flange by a cleat retention gap. Still further, the abutment includes an abutment face oriented toward the mounting flange and a snap-in cam on a side away from the abutment face. In addition, the body further includes a clip mounting post extending between the first and second ribs.

In one possible embodiment, the body further includes a third rib depending from the base. The third rib is positioned between the first and second ribs and reinforces the clip mounting post. In one possible embodiment, the body further includes a locator key for securing the assembly to a workpiece, such as an air filter housing, in a desired orientation. In one possible embodiment, that locator key projects from the face.

In one possible embodiment, the fastener includes a resilient mounting hook that snaps over the clip mounting post. That resilient mounting hook includes a gap providing clearance for the third rib.

In one possible embodiment, the first and second ribs both include one resilient locking arm at each end thereof. In another possible embodiment, the first rib includes one resilient locking arm at a first end and a first mounting shoulder at a second end while the second rib includes one resilient locking arm at a third end and a second mounting shoulder at fourth end.

In accordance with an additional aspect, an air filter housing assembly is provided for a motor vehicle. That air filter housing assembly comprises a housing including a mounting aperture, a discrete clip cleat received and held in that mounting aperture, a fastener carried on the cleat clip, and a lid secured to the housing by the fastener. Still further, the discrete clip cleat includes a body having a base, a first rib depending from the base and a second rib depending from the base. Both of the first and second ribs include at least one resilient locking arm. In addition, the base includes a mounting flange extending beyond the first and second ribs. Each resilient locking arm includes a distal end having an abutment directed toward and spaced from the mounting flange by a cleat retention gap. The abutment includes an abutment face oriented towards the mounting flange and a snap-in cam on a side away from the abutment face.

In the following description, there are shown and described several preferred embodiments of the snap-in spring clip assembly as well as the air filter housing assembly. As it should be realized, these assemblies are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip assembly and air filter housing assembly and together with the description serve to explain certain principles thereof. In the drawing figures.

Figure 3A:
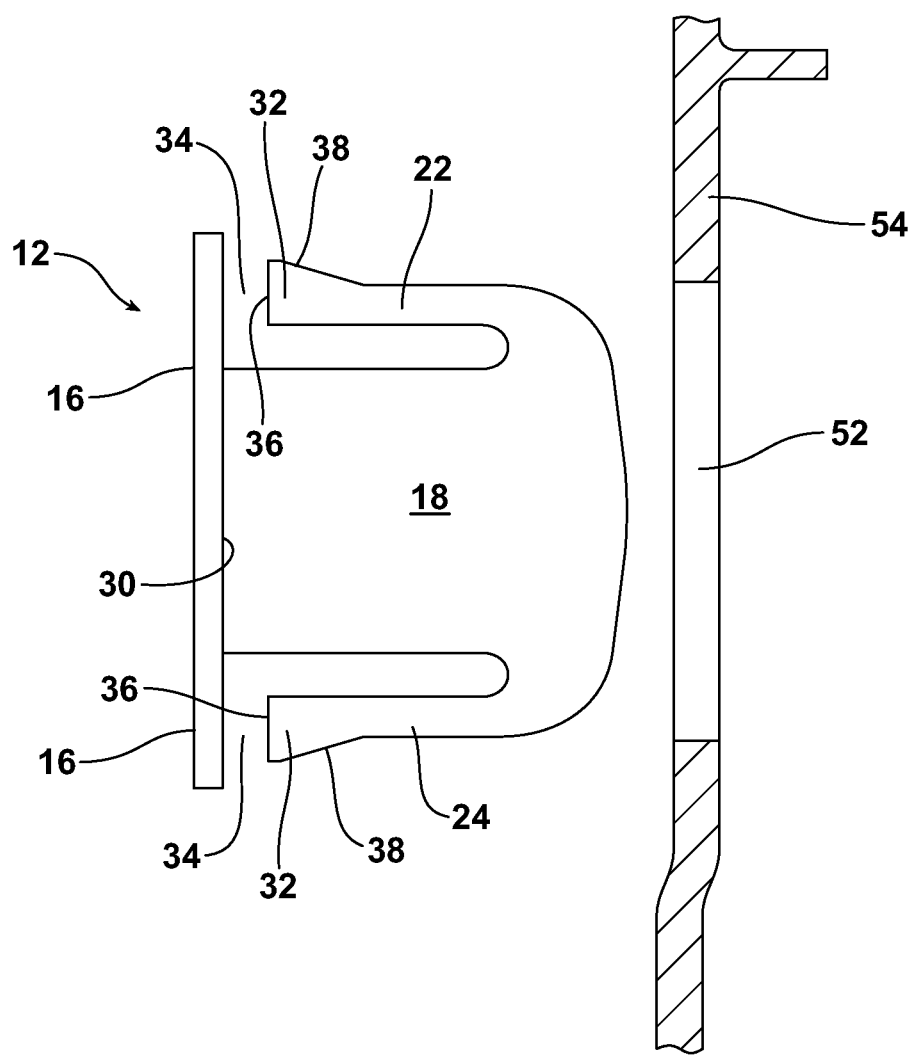
Figure 3B:
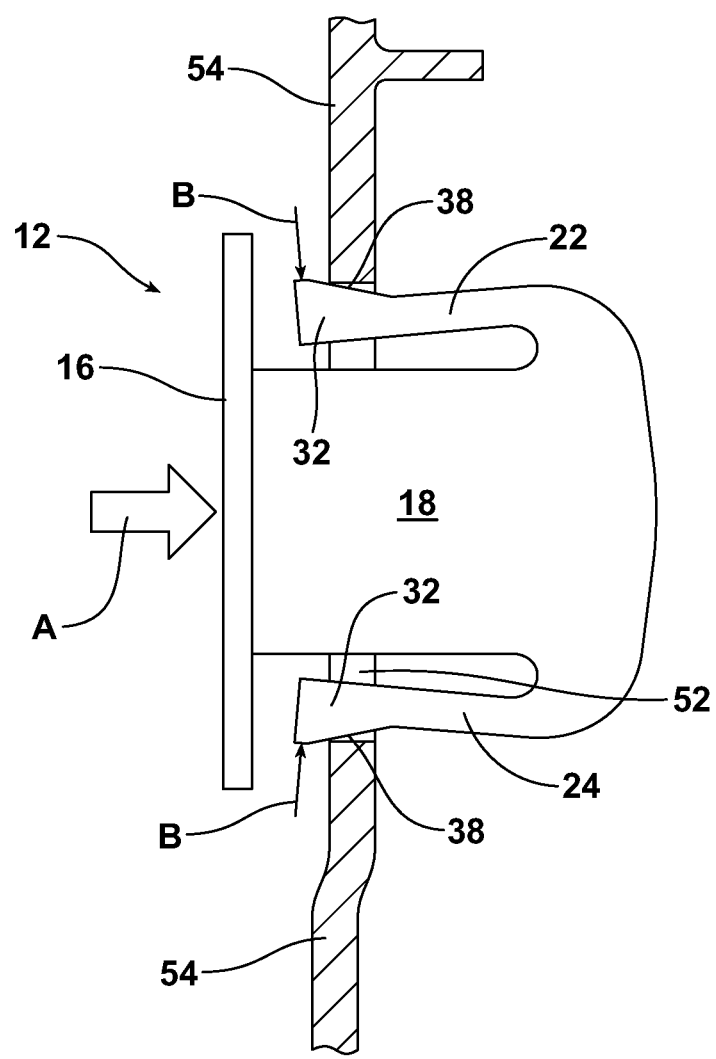
Figure 3C:
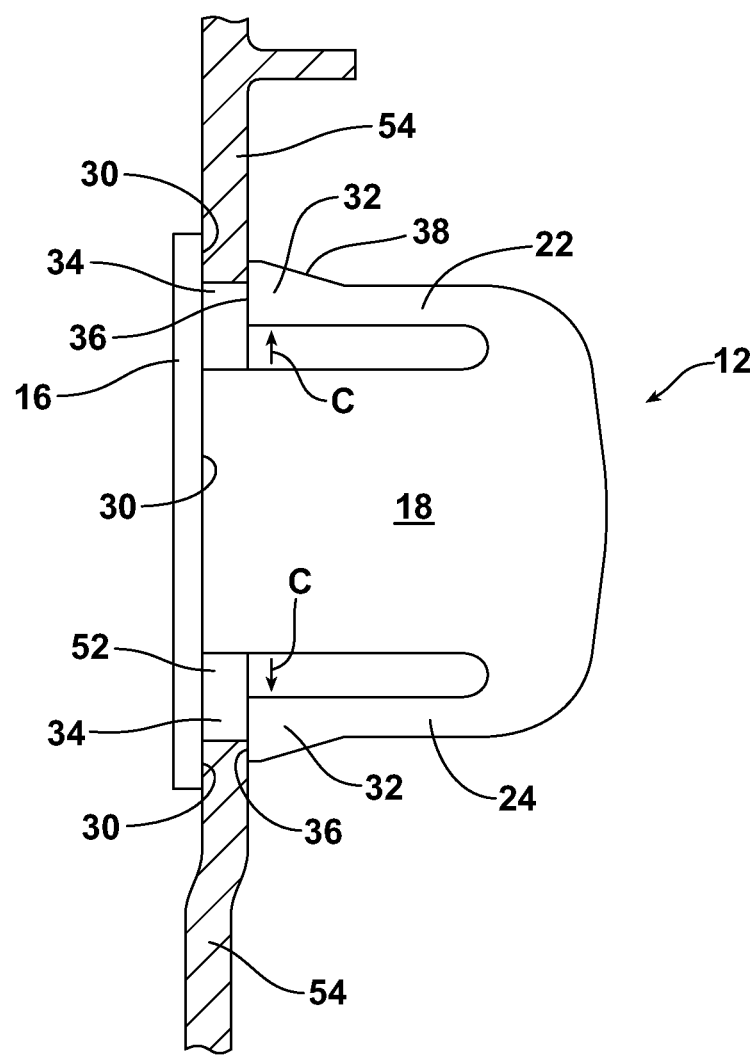

FIGS. 3a, 3b, and 3c illustrate insertion of the discrete clip cleat into the mounting aperture from the inside or back side of the housing. More specifically, FIG. 3a is side elevational view showing the clip cleat aligned with the aperture in the housing but not yet projecting through the aperture. FIG. 3b is a side elevational view showing the clip cleat inserted into the aperture far enough for the walls of the aperture to engage the cams of the resilient locking arms causing those arms to bend toward each other and allow clearance for insertion of the discrete clip cleat into the mounting aperture. FIG. 3c illustrates the clip cleat fully seated and locked in the mounting aperture of the housing.

Figure 4:
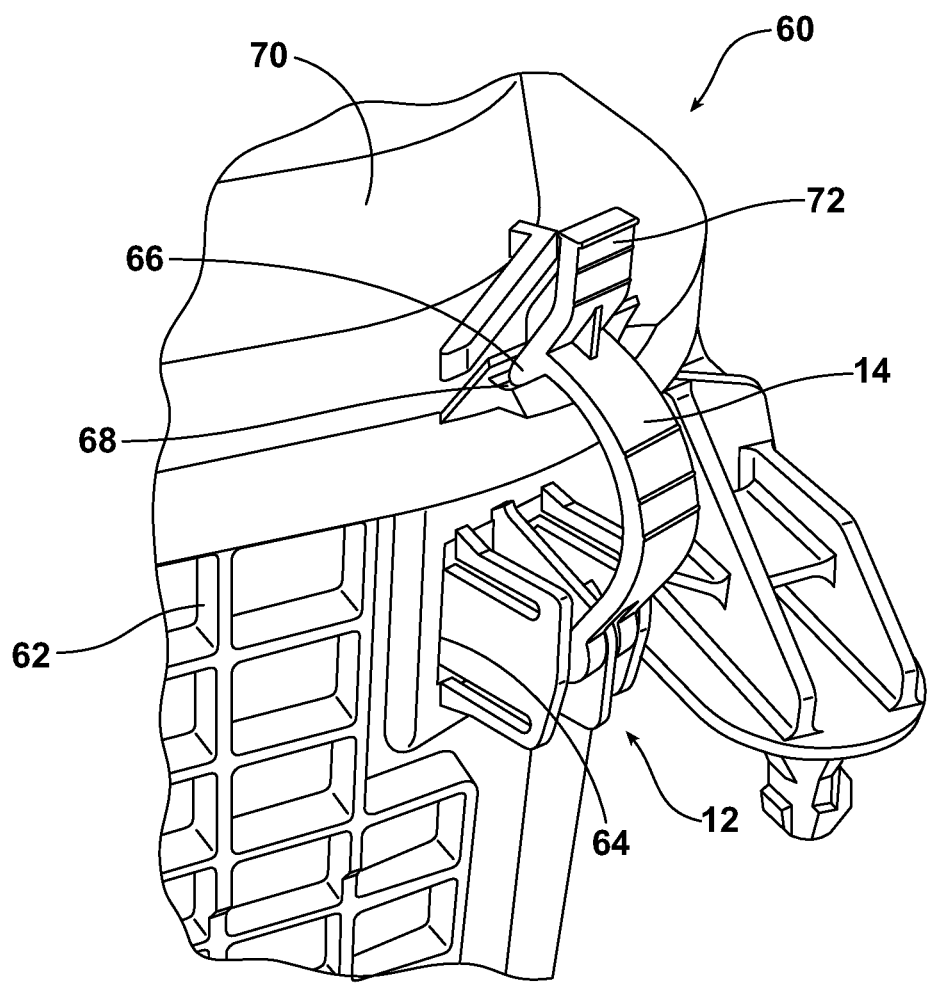

FIG. 4 is a perspective view illustrating the air filter housing assembly with a fastener or clip engaging the lid and holding the lid on the housing.

Figure 5:
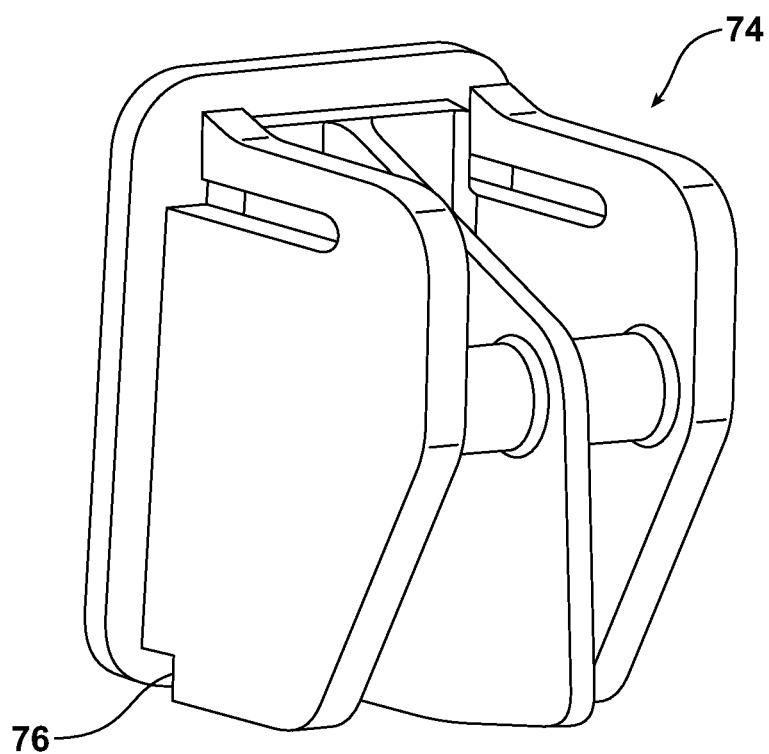

FIG. 5 is a perspective view of a second embodiment of the discrete clip cleat which incorporates resilient locking arms at one end and mounting shoulders at the other, opposite end.

Reference will now be made in detail to the present preferred embodiments of the snap-in spring clip assembly, examples of which are illustrated in the accompanying drawing figures.

DETAILED DESCRIPTION

Figure 1:
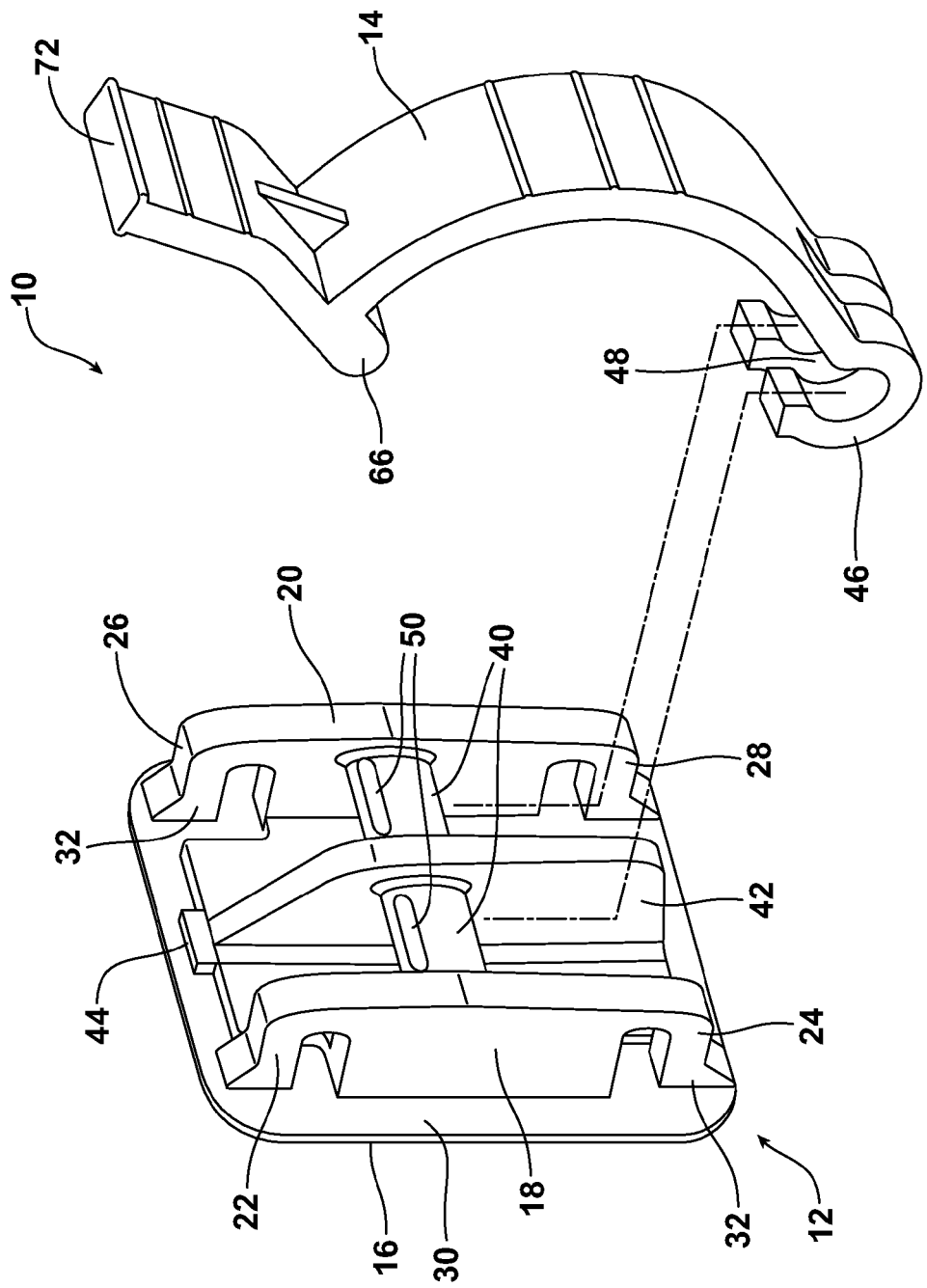
FIG. 1 is an exploded perspective view of the clip cleat and the fastener clip carried on the clip cleat.

Reference is now made to FIG. 1 illustrating the snap-in spring clip assembly 10 including a discrete clip cleat 12 and a fastener or spring clip 14 carried on the clip cleat. As best illustrated in FIG. 1, the discrete clip cleat 12 comprises a body having a base 16, a first rib 18 depending from the base and a second rib 20 depending from the base. In the illustrated embodiment, the first and second ribs 18, 20 are substantially parallel and project from the same side of the base 16.

As illustrated, the first rib 18 includes a first resilient locking arm 22 at a first end and a second resilient locking arm 24 at a second end. Similarly, the second rib 20 includes a third resilient locking arm 26 at a first end and a fourth resilient locking arm 28 at a second end.

As best illustrated in FIGS. 1 and 3a, the base 16 includes a mounting flange 30 that extends beyond the ends and the outer sides of the first and second ribs 18, 20. Further, each resilient locking arm 22, 24, 26, 28 includes a distal end having an abutment 32 directed toward and spaced from the mounting flange 30 by a cleat retention gap 34.

More specifically, each abutment 30 includes an abutment face 36 oriented directly toward the being mounting flange 30 and a snap-in cam 38 on a side away from the abutment face (see FIG. 3a). The operation and function of that cam 38 will be described in greater detail below.

Referring back to FIG. 1, the discrete clip cleat 12 further includes a clip mounting post 40 extending between the first and second ribs 18, 20. In addition, the discrete clip cleat 12 of the illustrated embodiment also includes a third rib 42 positioned between and spaced from the first and second ribs 18, 20. This third rib 42 reinforces the clip mounting post 40.

Figure 2:
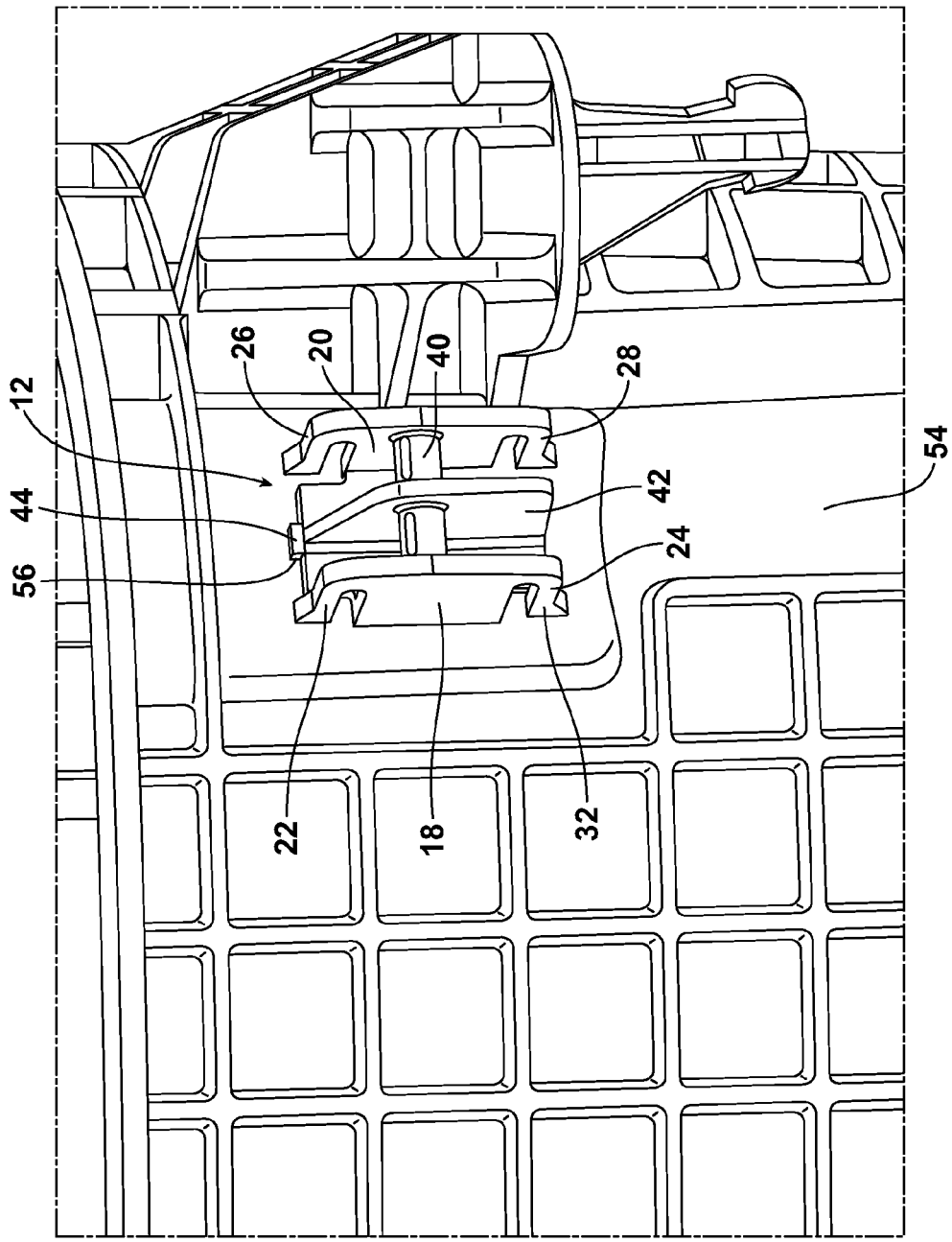
FIG. 2 is a perspective view of the clip cleat held in a mounting aperture of the housing of an air filter housing assembly.

As also illustrated in FIG. 1, the discrete clip cleat 12 includes a locator key 44 for securing the discrete clip cleat 12/spring clip assembly 10 in a desired orientation with respect to the locator notch 56 to which it is attached (see FIG. 2). In the illustrated embodiment that locator key 44 projects from the base 16. The fastener or spring clip 14 includes a resilient mounting hook 46. The resilient mounting hook 46 includes a gap 48 providing clearance for the third rib 42, thereby allowing a resilient mounting hook 46 to be pushed over and snapped onto the clip mounting post 40 (note the recess 50 in the top of the clip mounting post 40 that makes it easier to install the clip 14).

The discrete cleat clip 12 may be molded as a unitary body from substantially any appropriate material including, for example, polypropylene or nylon reinforced with fiberglass or other appropriate reinforcement material. If desired, the spring clip 14 may also be molded from this material. Alternatively, the spring clip 14 could be made from metal. It is even possible to make the clip cleat 12 out of metal if desired.

Reference is now made to FIGS. 3a-3c which illustrate, step-by-step, the installation of the discrete clip cleat 12 into a mounting aperture 52 of a wall or housing 54. As illustrated in FIG. 3a, the discrete clip cleat 12 is aligned with the mounting aperture 52 and oriented so that the ribs 18, 20, 42 are projecting toward the aperture. In addition, the locator key 44 is oriented toward locator notch 56 in the housing 54 (see also FIG. 2).

Next, the discrete clip cleat 12 is pushed through the mounting aperture 52, in the housing 54 from the interior or back side (note action arrow A). As this is done, the wall forming the perimeter of the mounting aperture 52 engages the snap-in cams 38 of each abutment 32 thereby causing the resilient locking arms 22, 24, 26, 28 to flex together (note action arrows B) so that the abutment 32 will pass through the mounting aperture. See FIG. 3b.

When the discrete clip cleat 12 is fully seated in the mounting aperture 52, the mounting flange 30 of the base 16 abuts the margin of the wall or housing 54 around the mounting aperture and the locator key 44 on the base is received in the locator notch 56. In addition, the abutments 32 at the ends of the resilient locking arms 22, 24, 26 have passed entirely through the mounting aperture 52 and cleared the wall or housing 54. They then spring outwardly (note action arrow C) by resilient memory into their normal or rest position so that the wall or housing 54 is captured in the cleat retention gap 34 formed between the abutment faces 36 and the mounting flange 30. Thus, the discrete clip cleat is securely held in position in the mounting aperture 52. Installation is then completed by simply snapping the spring clip 14 onto the clip cleat 12 held in the housing 54. This is done by snapping the resilient mounting hook 46 onto the clip mounting post 40.

Reference is now made to FIG. 4 which illustrates an air filter housing assembly 60 comprising a housing 62 including a mounting aperture 64. As illustrated in FIG. 4, a discrete clip cleat 12 is seated in the mounting aperture 64. A spring clip 14 carried on the mounting post 40 of the clip cleat 12 includes a locking tab engaging in a locking aperture 68 of a housing lid 70. The lug 72 at the end of the clip 14 allows one to snap the locking tab 66 over the edge of the lid 70 into the locking notch 68 so that the clip 14 will resiliently pressure and hold the lid 70 in place on the housing 62. Whenever it is necessary to remove the lid 70 to gain access to the interior of the air filter housing assembly 60, for example, to check, clean or change the filter element (not shown), one simply engages the lug 72 and pivots the clip 14 about the mounting post 40 thereby removing the locking tab 66 from engagement with the lid 70. Once all the clips 14 are released, the lid 70 is easily removed from the housing 62.

Reference is now made to FIG. 5 illustrating yet another embodiment of the discrete clip cleat. This embodiment of the discrete clip cleat 74 is identical to the embodiment illustrated in the previous figures except for the fact that the resilient locking arms 28, 30 at the lower side of the clip cleat 74 have been replaced by mounting shoulders 76 (only one is visible in the drawing figure).

The foregoing has been presented for purposes of illustration and description. It is not intended to be exhaustive or to limit the embodiments to the precise form disclosed. Obvious modifications and variations are possible in light of the above teachings. For example, the spring clip 14 could be a three-piece bail clamp, a strip steel clamp or other overcenter toggle structure. Further, while the illustrated embodiment shows the clip cleat 12 being inserted into the mounting aperture 52 from the inside of the housing 54, it should be appreciated that it could be inserted from the outside for certain applications if desired. Also, while the illustrated embodiment includes a locator key 44 to provide for orientation of the clip cleat 12, it should be appreciated that the clip cleat 12 could be more symmetrical, if desired, thereby eliminating any need for a locator key. All such modifications and variations are within the scope of the appended claims when interpreted in accordance with the breadth to which they are fairly, legally and equitably entitled.

What is claimed:

1. An air filter housing assembly for a motor vehicle, comprising:
   a housing including a mounting aperture;
   a discrete clip cleat received and held in said mounting aperture;
   a fastener carried on said clip cleat; and
   a lid secured to said housing by said fastener.

2. The assembly of claim 1, wherein said discrete clip cleat includes a body having a base, a first rib depending from said base and a second rib depending from said base.

3. The assembly of claim 2, wherein both of said first and second ribs include at least one resilient locking arm.

4. The assembly of claim 3, wherein said base includes a mounting flange extending beyond said first and second ribs.

5. The assembly of claim 4, wherein each resilient locking arm includes a distal end having an abutment directed toward and spaced from said mounting flange by a cleat retention gap.

6. The assembly of claim 5, wherein said abutment includes an abutment face oriented toward said mounting flange and a snap-in cam on a side away from said abutment face.

* * * * *